March 12, 1946.  E. W. LARSEN  2,396,378

SORTING APPARATUS

Filed Dec. 22, 1942  6 Sheets-Sheet 1

INVENTOR
E. W. LARSEN
BY Harry L. Duft
ATTORNEY

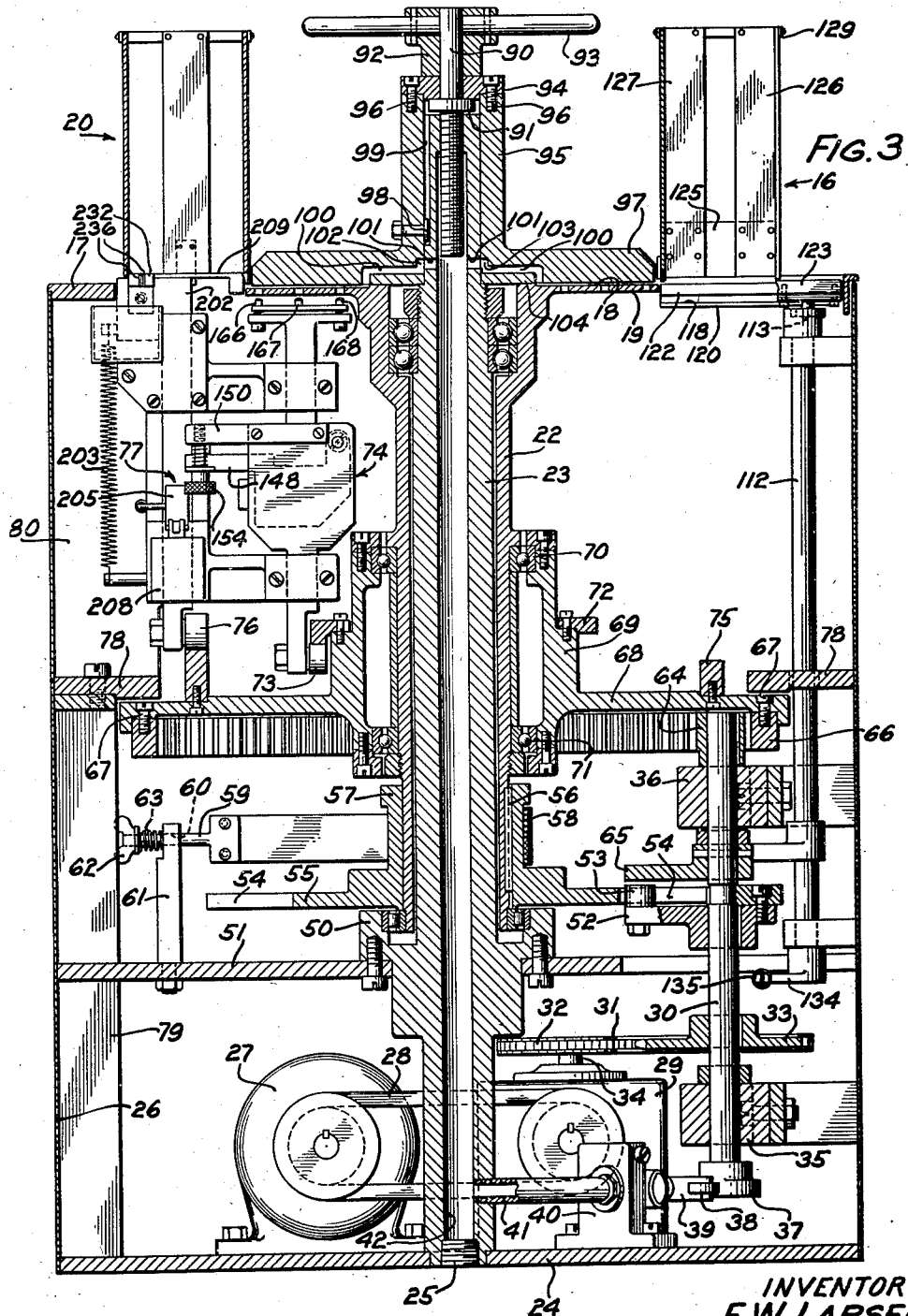

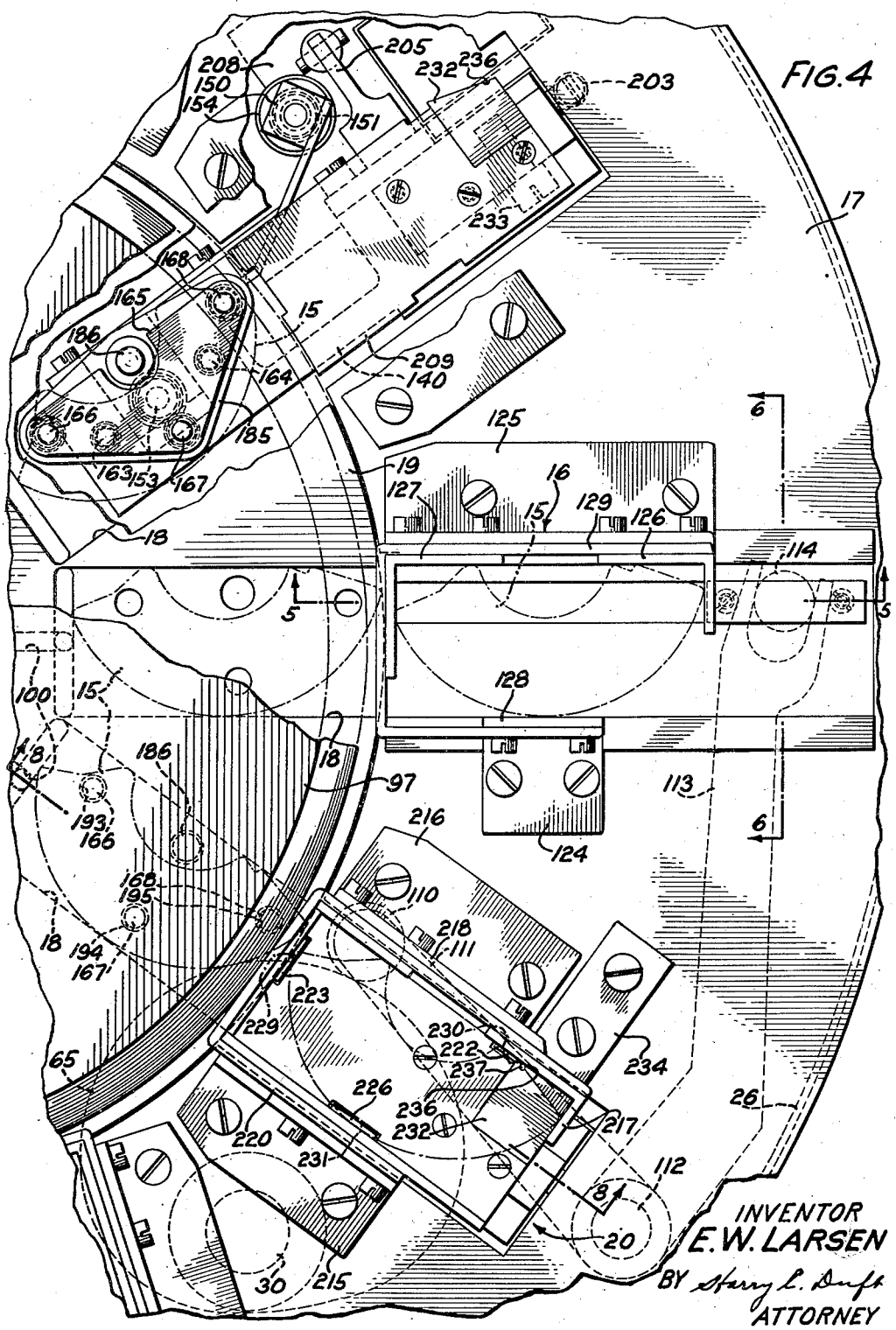

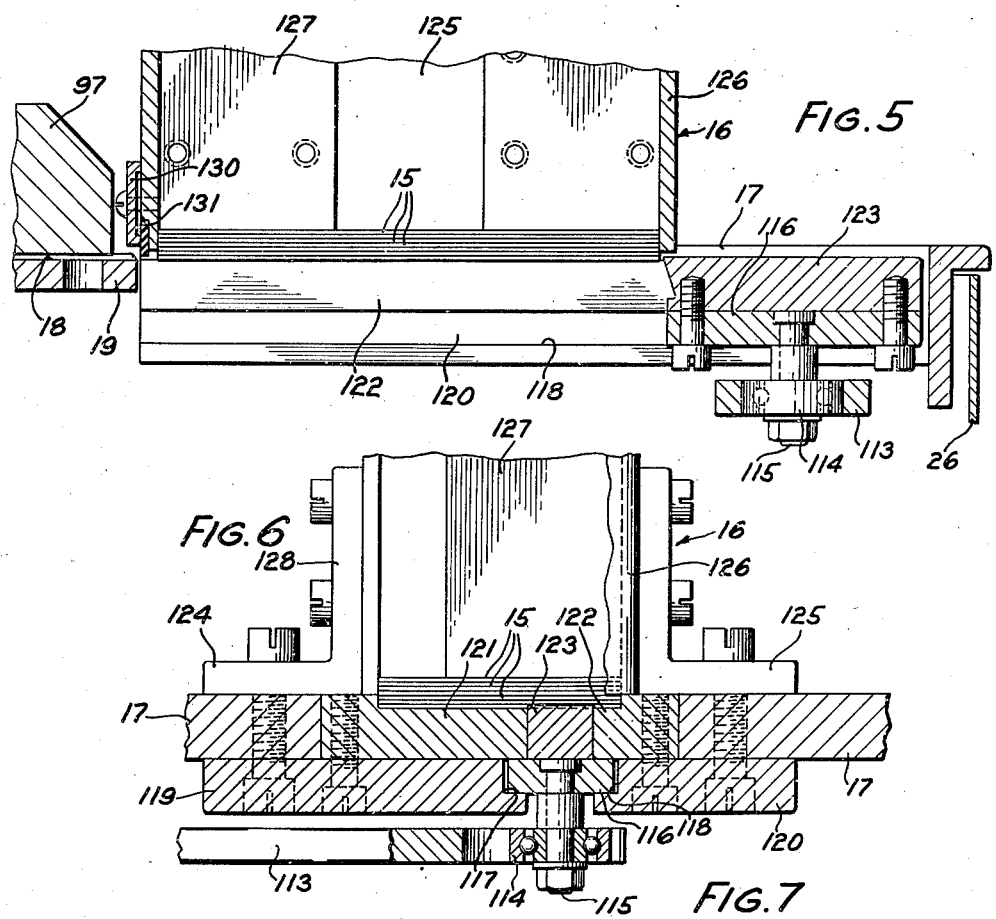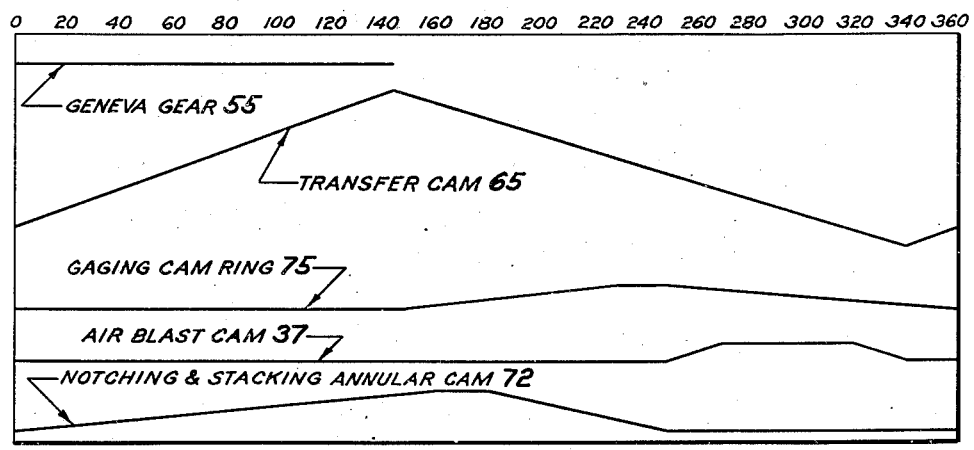

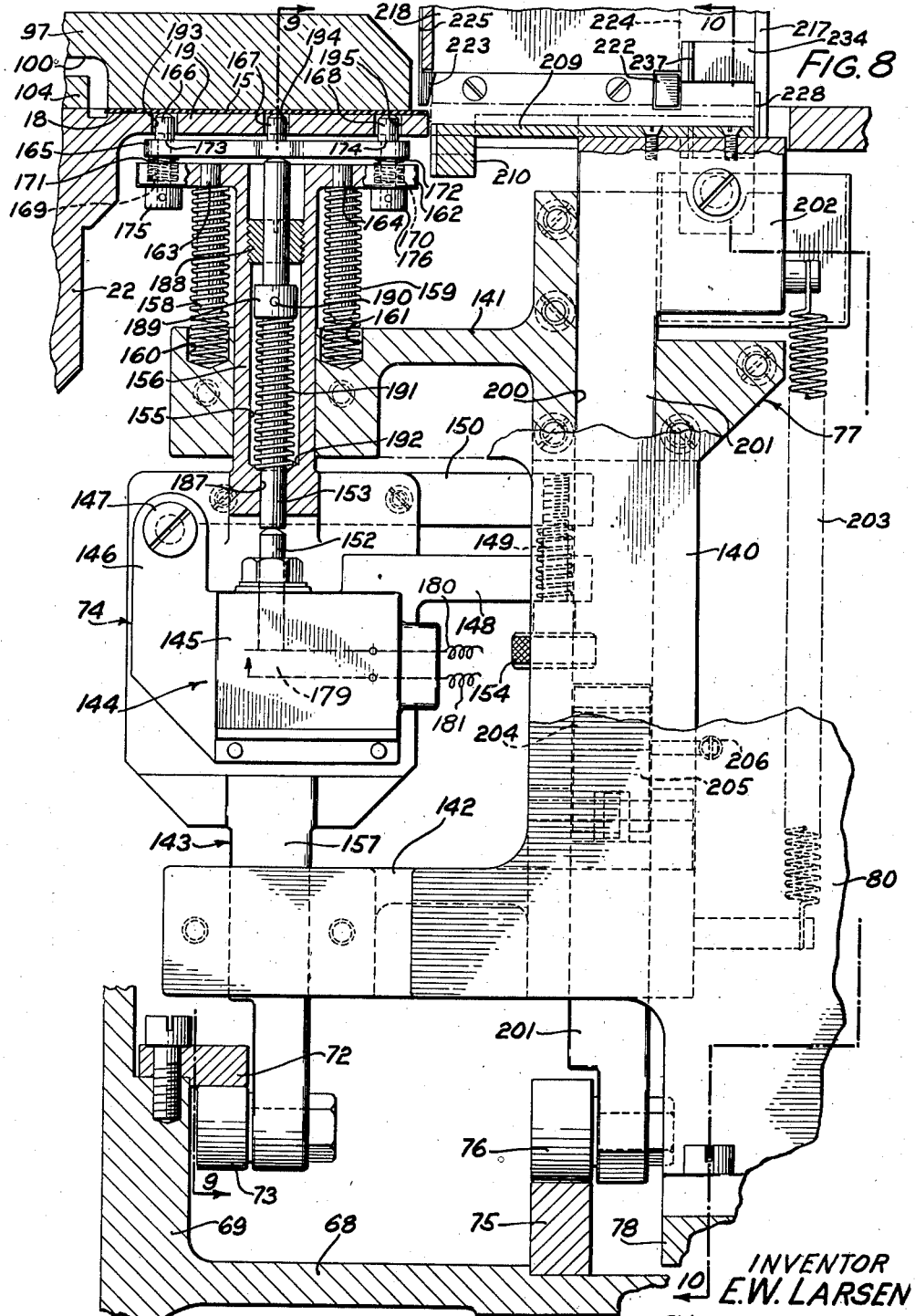

March 12, 1946. E. W. LARSEN 2,396,378
SORTING APPARATUS
Filed Dec. 22, 1942 6 Sheets-Sheet 6
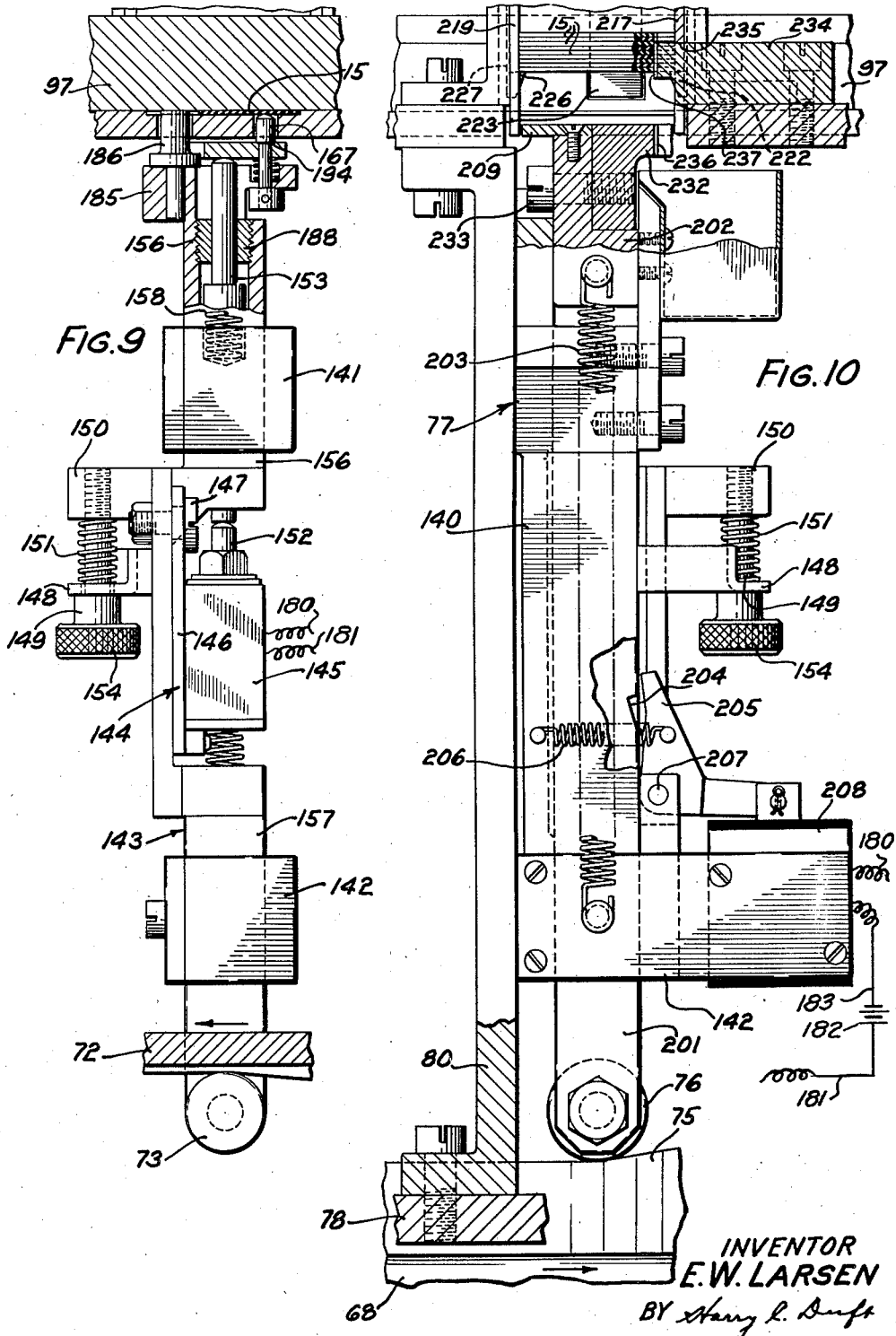
INVENTOR
E. W. LARSEN
BY Harry R. Duft
ATTORNEY Patented Mar. 12, 1946

2,396,378

UNITED STATES PATENT OFFICE 2,396,378

SORTING APPARATUS

Einer W. Larsen, Elmhurst, Ill., assignor to Western Electric Company, Incorporated, New York, N. Y., a corporation of New York Application December 22, 1942, Serial No. 469,785

8 Claims. (Cl. 164—115)

This invention relates to sorting apparatus and more particularly to an apparatus for measuring the thickness of articles, marking them with indicia to indicate their thickness, and sorting them into groups in accordance with their thickness.

It is an object of the present invention to provide an apparatus for expeditiously sorting articles in accordance with a characteristic thereof.

In accordance with one embodiment of the invention, insulators are fed from a magazine in automatic succession to an indexing turntable, which carries them around to a plurality of gaging stations at which the insulators are engaged by gaging apparatus which measures a dimension of them and if they fall within predetermined dimensional limits, initiates the operation of mechanisms for feeding the insulators off the turntable into magazines wherein the insulators are marked to indicate the limits within which they fall.

A better understanding of the invention may be had by reference to the following detailed description when considered in conjunction with the accompanying drawings, wherein:

Fig. 3 is a transverse vertical sectional view through the apparatus taken substantially along the line 3—3 of Fig. 1 in the direction of the arrows;

Fig. 4 is an enlarged fragmentary plan view of a portion of the apparatus showing a supply magazine from which the insulators are fed and showing two of the receiving magazines to which gaged insulators are fed from the turntable, parts of the mechanism being broken away to more clearly illustrate those parts directly beneath them;

Fig. 5 is a transverse vertical sectional view taken substantially along the line 5—5 of Fig. 4 in the direction of the arrows and showing, on an enlarged scale, some details of the mechanism for feeding insulators from the supply magazine;

Fig. 6 is a vertical sectional view on the same scale as Fig. 5 and taken substantially along the line 6—6 of Fig. 4 in the direction of the arrows;

Fig. 7 is a camming diagram showing the relative time of operation of the various cams which operate parts of the apparatus;

Fig. 8 is an enlarged fragmentary detailed sectional view taken substantially along the line 8—8 of Fig. 4 in the direction of the arrows and showing the details of one of the gaging mechanisms and its associated magazine, together with a portion of the mechanism for marking insulators as they are fed to the receiving magazines;

Fig. 9 is a fragmentary sectional view taken substantially along the line 9—9 of Fig. 8 in the direction of the arrows and showing details of the gaging mechanism; and Fig. 10 is a fragmentary vertical sectional view taken substantially along the line 10—10 of Fig. 8 in the direction of the arrows showing details of the mechanism for marking an insulator and stacking it in the receiving magazine.

Figure 1:
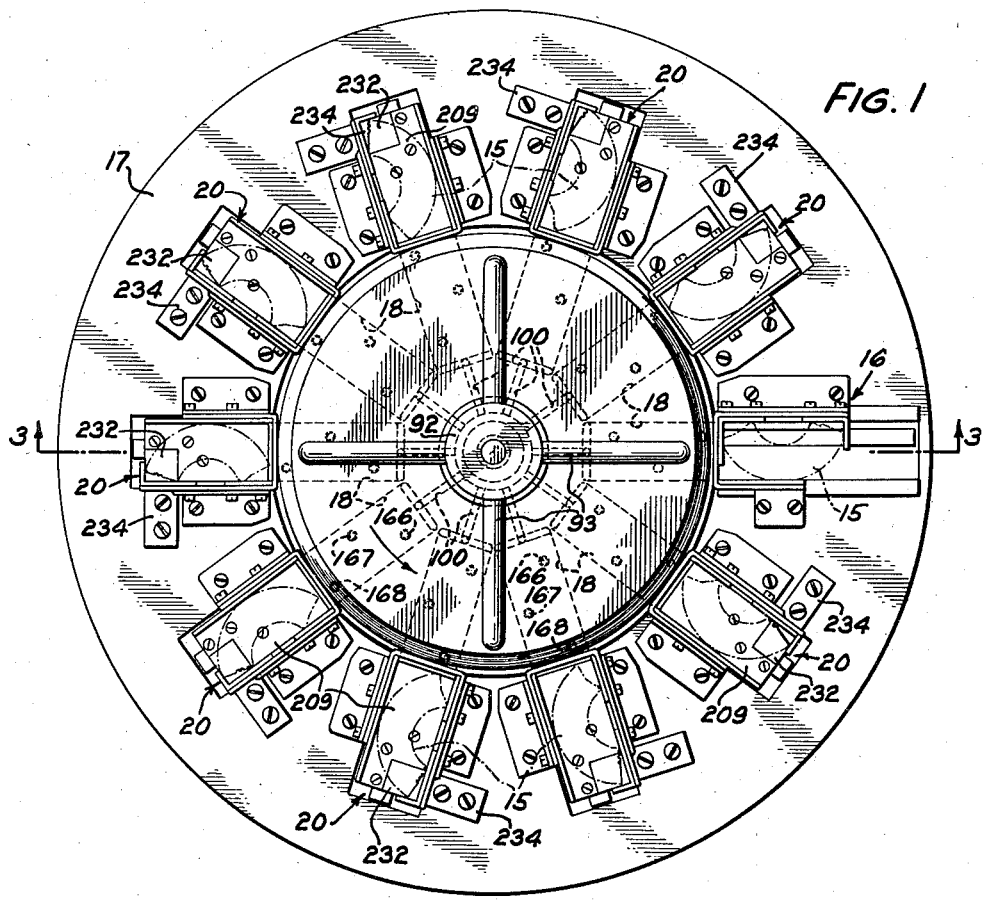
Fig. 1 is a plan view of an apparatus embodying the present invention and designed to gage the thickness of irregularly shaped insulators.
Figure 2:
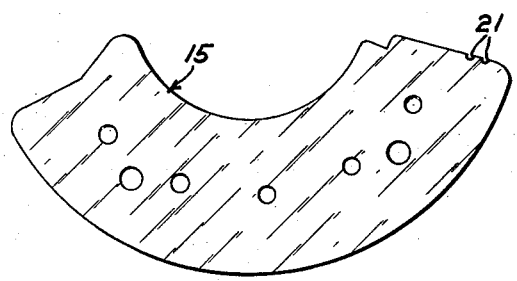
Fig. 2 is a plan view of an insulator of the type gaged in the apparatus and marked with notches to indicate the thickness class in which it falls.

In the drawings, particular reference being had to Figs. 1 and 3, there is shown an apparatus for gaging step by step insulators 15 of the type shown in Fig. 2. These insulators 15, as most clearly shown in Fig. 2, are arcuate in shape and vary in thickness as much as 100%. The insulators 15 are stacked in a supply magazine 16 mounted on the upper surface of a housing 17 and may be fed into slots 18—18 in a turntable 19 (Figs. 3 and 4) in a manner to be described more in detail hereinafter. The turntable 19 is indexed step by step and will carry an insulator 15 around with it until the insulator arrives opposite one of a plurality of receiving magazines, all of which are of the same construction. When an insulator arrives at a position about the turntable 19, where it is gaged and should be fed into one of the receiving magazines 20, it is driven into position beneath the magazine by a blast of air and will then be forced upwardly past notching devices to cut notches 21 (Fig. 2) in the insulator to indicate in which thickness group the insulator falls. The turntable 19 (Fig. 3) is mounted on the upper end of a sleeve 22, which is rotatable about a central hollow spindle 23. The spindle 23 is mounted in a base plate 24 and has its lower end plugged by means of a plug member 25. The base 24 is circular in configuration and has attached to its outer edge a housing 26, which encloses the moving parts of the mechanism. Suitably mounted on the base plate 24 is a driving motor 27, which, through a V-belt 28, drives a speed reducer 29. The speed reducer 29, in turn, drives a countershaft 30 through the action of a chain 31 engaging sprockets 32 and 33 on the output shaft 34 of the speed reducer and the countershaft 30, respectively. The countershaft 30 is journalled in a pair of bearings 35 and 36 suitably secured to the housing 26 and carries at its lower end a cam 37 for controlling the supply of air to the hollow spindle 23. The cam 37 has cooperating with it a cam roller 38 mounted on the control arm 39 of an air valve 40, which is supplied with air under pressure from any suitable source (not shown) and which, upon operation by the control arm 39, will direct a blast of air through a pipe 41 to the central bore 42 of the hollow spindle.

Fixed to an annular shoulder 50 on the spindle 23 is a spider 51, which serves to brace the housing 26. The countershaft 30 extends upwardly through the spider or bracing plate 51 and has keyed to it a Geneva drive 52, the drive roller 53 of which is positioned to engage in slots 54 in a Geneva gear 55. The Geneva gear 55 encircles and is keyed to the sleeve 22 by means of a key 56, whereby, when motion is imparted to the Geneva gear 55 by the Geneva drive 52, the sleeve 22 will be moved and will index the table 19. The key 56 is positioned between an annular shoulder portion 57 of the Geneva gear 55 and the sleeve 22. This shoulder portion 57 serves as a brake drum for cooperation with a brake band 58, which encircles the shoulder portion 57 and has its ends connected to a threaded member 59. The threaded member 59 extends through an aperture 60 in a bracket 61, which is, in turn, mounted upon the spider 51. A thumb nut 62 is threaded onto the threaded member 59 and a coil spring 63 is interposed between the thumb nut 62 and the bracket 61 whereby any desired amount of braking pressure may be applied through the brake band 58 to the shoulder 57 to prevent accidental displacement of the table 19.

In addition to the cam 37 and Geneva drive 52, the counter shaft 30 carries a pinion 64 and a cam 65. The pinion 64 meshes with an internal ring gear 66, which is fixed, by means of machine screws 67, on the underside of a disc 68. The disc 68 extends outwardly from a collar or hub 69, which surrounds the sleeve 22 and is freely rotatable thereabout on bearings 70 and 71. The collar or hub 69 carries an annular cam 72, which surrounds it and serves to actuate a cam roller 73, which drives a gaging mechanism, designated generally by the numeral 74. Mounted on the disc 68 adjacent the periphery thereof is an annular cam ring 75 having cooperating therewith a cam roller 76, which drives a stacking and notching mechanism designated generally by the numeral 77. Within the housing 26, there are provided eight sets of gaging mechanisms 74, each set having a cam roller 73 for imparting reciprocation to it under control of the annular cam 72 and there are nine of the stacking and notching mechanisms 77 adapted to be actuated by cam rollers 76. In Fig. 3, there is shown a bracing ring 78, which extends around inside the housing 26 and is mounted on brackets 79. This bracing ring is positioned just slightly above the upper surface of the disc 68 and serves to support a plurality of brackets 80, of which there are nine provided for supporting nine stacking and notching mechanisms 77 and the eight gaging mechanisms 74. The gaging mechanisms 74 and the notching and stacking mechanisms 77 are all of exactly the same construction and one of each of these units will be described more in detail hereinafter.

As described hereinbefore, the hollow spindle 23 is provided with a central bore 42 and the lower end of the spindle is plugged with a plug member 25. The upper end of the spindle 23 has threaded into it a rod 90 having a shoulder 91 formed intermediate its ends. At its upper end, the rod 90 has attached to it a hub member 92, from which extend a plurality of spokes 93, whereby the rod 90 may be rotated. Surrounding the rod 90 intermediate the hub 92 and shoulder 91 is an annular plate 94 having a sleeve 95 attached to it by means of machine screws 96. The sleeve 95 has formed integrally with it a cover plate 97, which serves to cooperate with the slots 18 in the turntable 19 to form passageways in which the insulators 15 may be carried around the spindle 23 and from which the insulators 15 may be ejected by an air blast. The sleeve 95 is held against rotation around the spindle 23 by a key member 98 mounted in the sleeve and extending into a key slot 99 formed in the upper end of the spindle 23. By the provision of the just described structure, the cover plate 97 may be raised by operating the spokes 93 manually to drive the rod 90 in the proper direction and the cover plate 97 will be raised straight up away from the turntable 19 in the event that insulators jam in the slots 18. However, the normal operating position of the cover plate 97 is as shown in Fig. 3, where a plurality of slots 100 cut in the lower face of the cover plate 97 cooperate with apertures 101 (Figs. 1 and 3) to direct a blast of air blown into the lower end of the spindle out through the slots 100 into the slots 18 for blowing insulators 15 into selected ones of the magazines 20. There are provided two of the apertures 101 in the spindle 23 and these apertures communicate with an annular chamber 102 formed by a shoulder 103 cut into the lower face of the plate 97 and an annular plate 104 mounted on the spindle 23.

Cooperating with the cam 65 (Figs. 3 and 4) is a cam roller 110 mounted upon the free end of cam arm 111, which is fixed to a vertically extending shaft 112. The shaft 112 has fixed at its upper end a forked lever 113, in the outer forked end of which there is positioned a roller 114 and has attached to its lower end an arm 134 (Fig. 3), to which a spring 135 is attached for normally urging the shaft 112 to rotate counter-clockwise, as viewed in Fig. 4. The roller 114 is freely rotatable about a stud shaft 115 fixed in a slide 116 (Figs. 5 and 6). The slide 116 is slidable in ways 117 and 118 formed by plates 119 and 120 and plates 121 and 122 set flush with the upper surface of the housing 17. Attached to the upper surface of the slide 116 is a knife-edged feeding member 123, which is adapted to engage the bottom insulator 15 of a stack of insulators in the supply magazine 16. The supply magazine 16 is mounted on the upper surface of the housing 17 by means of a pair of brackets 124 and 125. The bracket 125, in turn, supports a pair of angle plates 126 and 127, which serve as bearing surfaces against which the insulators 15 are guided in the magazine. The bracket 124 supports a bearing plate 128, which engages the rounded surface of the insulators 15 and guides them as they are held in the supply magazine 16. The upper ends of the angle plates 126, 127 and bearing plate 128 are banded together by a U-shaped band 129. The magazine thus formed is adapted to support the supply of insulators 15 which are to be gaged and the plates 121 and 122 are cut out to permit the insulators 115 to assume a position where the bottom three insulators are beneath the upper surface of the housing 17. The plate 127, as seen most clearly in Fig. 4, extends an appreciable distance across the left end of the magazine and carries, as shown most clearly in Fig. 5, a clamp member 130, which serves to hold a soft rubber stripper 131 in position at the exit end of the magazine. This construction is provided since the insulators being gaged in the apparatus may vary as much as 100% in thickness and, accordingly, no rigid head or orifice could be provided at the exit end of the magazine. However, the upper surface of the feed member 123 is positioned only a very short distance above the surface of the plates 121 and 122 on which the insulators rest so that only one insulator at a time will be picked off the bottom of the magazine 16 for each reciprocation of the feeding member 123 and the soft rubber stripper 131 will prevent more than one insulator at a time from being fed out of the supply magazine 16 and into the slot 18 on the turntable 19.

Insulators 15, which are fed into the slot 18 on the turntable 19, will, when the turntable is indexed through the Geneva drive 52, be carried in a counter-clockwise direction to the various gaging mechanisms 74, which will gage the article and control which of the receiving magazines 20 will receive the article when the blast of air under pressure is directed through the hollow spindle 23. The gaging mechanisms 74 are all of the same construction, as pointed out hereinbefore, and only one of them will be described in detail, but it should be understood that in the travel of the insulator on the turntable 19, it will first be associated with a receiving magazine 20 adapted to receive those insulators which are oversize and will then be gaged successively by the next succeeding seven gaging mechanisms 74 and may be finally directed into a receiving magazine 20, which receives the undersize insulators. The travel of an insulator 15 around with the turntable 19 may be interrupted at any one of the receiving magazines when the insulator is found to fall within the group that is to be received in that particular magazine 20. Thus, the insulators will, if oversize, be directed into the first magazine 20 in a counter-clockwise direction from the supply magazine 16 and if the insulator is undersize, it will be carried all the way around to the last receiving magazine 20. An insulator which, during the gaging operations, is found to fall within one of the seven acceptable dimensional limits, will be directed into a receiving magazine 20 corresponding to that particular range of dimensions for which its gaging mechanism has been set.

The gaging mechanism 74, which, as pointed out hereinbefore, is mounted on a bracket 80, includes a supporting framework 140 fixed to the bracket 80. The framework 140 has a pair of bearing arms 141 and 142 extending from it, in the outer end of which a gage supporting assembly 143 is slidable. The gage supporting assembly has pivotally mounted upon it a highly sensitive electrical contact-making device 144 mounted in a housing 145. The housing 145 is provided with an upwardly extending arm 146 pivotally mounted on the gage supporting assembly 143 by means of a pivot pin 147. The housing 145 also has extending from it to the right (Fig. 8) an adjustment arm 148, which has extending through it an adjustment screw 149. The adjustment screw 149 is threaded into a bracket 150 fixed to the gage supporting assembly 143 and there is a spring 151 interposed between the arm 148 and the bracket 150, which normally tends to push the arm 148 away from the bracket 150 to carry a contact actuator 152 away from an actuator rod 153. The adjusting screw 149 is provided with a knurled head 154, whereby micrometric adjustments may be made of the position of the arm 148 with respect to the bracket 150 and, correspondingly, the position of the contact actuator 152 with respect to its associated actuator rod 153 may be very closely adjusted. The actuator rod 153 is positioned within a bore 155 formed in the gage supporting assembly 143. The bore 155 is held in an extending portion 156 of the assembly 143 which cooperates with a downwardly extending projection 157 of the assembly to slidably support the entire assembly for movement in the bearing arms 141 and 142. The projection 157 carries the cam roller 73 freely rotatable at its lower end and a pair of springs 158 and 159 seated in sockets 160 and 161, respectively, formed in the bearing arm 141 normally urge the entire gage supporting assembly 143 upwardly. The springs 158 and 159 are seated in the sockets 160 and 161 and engage a cross head 162 formed integrally with the extending portion 156 of the assembly 143 and the springs are maintained in their proper position by pins 163 and 164, respectively, which are fitted into the cross head 162 and extend downwardly therefrom, the springs 158 and 159 surrounding the pins throughout the entire length of the pins. In this manner, the gage supporting assembly 143 is normally urged upwardly and will be moved downwardly by the annular cam 72 against the action of the springs 158 and 159.

Mounted upon the cross head 162 is a gage plate 165 carrying three gage pins 166, 167 and 168 adapted to engage the insulator 15 at spaced points along its undersurface. The pin 167 is fixed to the gage plate 165, whereas the pins 166 and 168 extend through the plate 165 and are freely slidable in the cross head 162. The cross head 162 is provided with a pair of pockets 169 and 170 for receiving springs 171 and 172, respectively, which surround the reduced shanks of the gage pins 166 and 168 and bear against the undersurface of the gage plate 165 and the upper surface of the pockets 169 and 170, whereby the gage plate is urged to assume a horizontal position. The pins 166 and 168 have shoulders 173 and 174 formed on them for engaging the upper surface of the gage plate 165 and are threaded at their lower ends to receive adjusting nuts 175 and 176, whereby the pins 166 and 168 are held against movement upwardly beyond a predetermined adjusted position so that the upper gaging surfaces of the pins may be held normally in alignment with the pin 167 when the gage assembly is not performing a gaging operation. The extending portion 156 of the gage supporting assembly 143 has a shoulder 185 formed on it (Fig. 9), which carries a gage reference pin 186 adapted to engage the undersurface of the cover plate 97 when the gage supporting assembly 143 is permitted to move upwardly by the cam roller 73 and under the action of the springs 158 and 159. Thus, when the gage supporting assembly 143 is moved upwardly, the gage reference pin 186 will strike the cover plate 97 and prevent further movement of the assembly 143 upwardly. The actuator rod 153 bears at its lower end on a bearing surface 187 formed in the assembly 143 and adjacent its upper end the rod 153 is freely slidable in a bearing 188 threaded into the bore 155. Intermediate the bearing 188 and the bearing surface 187, the actuator rod 153 has a collar 189 fixed to it by means of a pin 190. The collar 189 serves as an abutment against which a compression spring 191 bears. The spring 191 surrounds the rod 153 and normally urges it upwardly due to the engagement of the spring with the collar 189 and an annular shoulder 192 formed in the bore 155. In this manner, the actuator rod 153 is normally held against the underside of the gage plate 165 and urges the gage plate to travel with the gage supporting assembly 143. When an insulator 15 is in position in a slot 18 above the three gage pins 166, 167 and 168 which pass freely through apertures 193, 194 and 195, respectively, in the turntable 19, the insulator will be engaged by the pins 66, 67 and 68, which will force it up against the under surface of the cover plate 97. Since the gage plate 165 is held in its upward position by the springs 171 and 172, the plate may tilt on the upper end of the actuator rod 153. However, since the three pins 166, 167 and 168 will engage the under surface of the insulator, the plate 165 will be depressed with respect to the gage reference pin 186 an amount represented by the average of the displacement of the three pins 166, 167 and 168 with respect to the gage reference pin 186 and will, accordingly, move the contact actuator 152 if the actuator rod 153 is pushed down far enough to engage the contact actuator 152. Since the position of the contact actuator 152 may be adjusted by means of the knurled thumb screw 149 with respect to the actuator rod 153, the contact making device 144 will have its contacts closed only when the insulator being gaged is over a predetermined average thickness throughout its length.

Since the gaging operations progress from oversize insulators 15 through the thinner insulators to an undersize insulator, it will be understood that the contact making device 144 will close its contacts to direct a part into the first receiving magazine 20 in a counter-clockwise direction from the supply magazine 16 if the part gaged is over a predetermined thickness. The relative position of the contact making devices 144 with respect to their cooperating actuator rods 153 around the turntable may be regulated in very small increments so that parts may be accurately gaged by the gaging mechanism 74 and circuits completed by the contact making devices 144 at one of the stations about the turntable for each part gaged.

The supporting framework 140 which supports the gaging mechanism 74 in the manner just described is provided with a slot 200, in which there is slidable a stacking rod 201. The stacking rod 201 carries at its lower end the cam roller 76 and is adapted to be reciprocated by the interaction of the cam roller 76 and the cam ring 75 as the disc 68 is rotated around the central spindle 23. The stacking rod 201 has a shoulder 202 formed on it, to which there is attached the upper end of a spring 203, whose lower end is attached to the supporting framework 140 (Fig. 8) in such a manner that the stacking rod 201 is urged downwardly by the spring 203, tending to hold the cam roller 76 in engagement with the cam ring 75. However, the rod 201 has a notch 204 formed in it into which a pawl 205 is urged by a contractile spring 206 and when the pawl 205 is engaged in the notch 204, the rod 201 will not be permitted to drop down to carry the roller 76 into engagement with the came ring 75, but will be held in an upward position unless the pawl 205 is rocked about its pivot 207 due to the energization of a solenoid 208. It will be noted, by reference to Figs. 8, 9 and 10 that the contact making device 144 includes a contact pair 179 adapted to be closed by the actuator rod 152. The contact pair 179 is connected by leads 180 and 181 to the solenoid 208 and a current source 182, respectively, and the current source and other side of the winding of the solenoid are connected one to another by a lead 183. There is provided one solenoid 208 at each of the gaging positions of the apparatus and these solenoids are controlled by the contact making device 144 at their associated station and unless the article being gaged at a station is thick enough to depress the actuator rod 153 at that station far enough to actuate the contact actuator 152, the stacking rod 201 will be held in is upper position. However, when the insulator 15 being gaged at the station is of a predetermined thickness, it will operate the contact making device 144 at that station, thereby to permit the stacking rod 201 to drop down and move the roller 76 into association with the cam ring 75. The stacking rod 201 carries at its upper end an insulator lifting plate 209, which has a thickened portion 210 on the edge thereof toward the turn table 19. When the stacking rod 201 is held up by the pawl 205, the thickened portion 210 of the plate 209 will be in the path of the insulator 15 in the slot 18 at that station. Therefore, when the blast of air is directed through the hollow spindle 23, insulators in the slots 18 adjacent receiving magazines 20, whose associated stacking rods are in the upper position, will be plugged by the portion 210 of the plate 209 and will be prevented from being blown into the magazine 20 at those stations. When an insulator being gaged arrives adjacent the receiving magazine 20, to which it should be directed, the gaging mechanism 74 will gage it and the contact making device 144 will close the circuit to the associated solenoid 208 and as soon as the solenoid 208 is energized, the stacking rod 201 at that station will drop down. The timing of the various cams in the apparatus is such that as soon as the stacking rod 201 drops down, the blast of air will be directed through the hollow spindle 23 and will blow the insulator 15 into position above the lifting plate 209 and in position to be lifted into the magazine 20.

The magazine 20 is quite similar in construction to the magazine 16, which has been described in detail hereinbefore with the exception that it is provided with means for notching insulators 15 as they are fed into position in it and is also provided with means for holding the insulators in position above the insulator lifting plate 209. As shown most clearly in Figs. 4, 8 and 10, the receiving magazines 20 each are mounted upon the upper surface of the housing 17 by means of brackets 215 and 216. The bracket 216 has fixed to it a pair of angle plates 217 and 218 and the bracket 215 has fixed to it a guide plate 219 and, similarly, to the magazine 16 there is provided a band 220 for bracing the upper ends of the angle plates 217 and 218 and the guide plate 219. Adjacent their lower ends, the angle members 217 and 218 have mounted on them spring pressed catches 222 and 223 mounted on letf springs 224 and 225, whereby the catches are normally urged to position to support any insulators which have been pushed past them in an upwardly direction, as shown, for example, in Fig. 10. The guide plate 219 is provided with a similar catch 226 and a spring 227, which cooperate with the catches 222 and 223.

An insulator 15, which is found to be of the proper gage, and is blown into position above one of the insulator lifting plates 209, will strike against a soft rubber abutment 228, which will cushion the stopping of the insulator in position above the plate 209. The abutment 228 is set into the lower end of the angle plate 217 and when an insulator is ejected from one of the slots 18 and into the bottom of one of the receiving magazines 20, the insulator will rest in the position illustrated by the dot and dash lines in Fig. 4, where its corners 229 and 230 will be in alignment with the inner surfaces of the angle plates 218 and 217, respectively, and its rounded surface 231 will be in alignment with the inner face of the guide plate 219. As the cam ring 75 continues in its rotation, an insulator which has been deposited in the bottom of one of the receiving magazines 20 will, at the proper time in the cycle of the operation of the apparatus, be lifted by the plate 209 and will be carried up past the catches 222, 223 and 226 and lodged by them in position above the plate 209 when the plate 209 is retracted. Mounted on the shoulder 202 of the stacking rod 201 is a notching punch 232, which is held in place on the shoulder 202 by a locking screw 233. This punch 232 cooperates with a notching die 234 mounted upon the upper surface of the housing 17 and having a cutting portion extending through an aperture 235 in the angle plate 217. The punches 232 at each of the receiving magazines 20 are of the same construction and the dies 234 are of the same construction except that each punch has notches 236 arranged differently in it from any of the other punches and the dies 234 differ only in the number or location of the projections 237 which cooperate with the notches 236 in the punches. In this manner, as the insulator lifting plate 209 lifts an insulator into its proper magazine 20, the cooperating punch 232 and die 234 at that magazine will notch the insulator to indicate whether it is under or oversize or one of the acceptable dimensions as controlled by the setting of the gaging mechanism 74.

In the herein described embodiment of the invention, the insulators being gaged are acceptable if they range from .013" to .019" in average thickness in increments of .001" and the gaging mechanisms 74 are set to gage parts of these dimensions. Any insulator 15 which is more than .019" in average thickness will be directed into the first receiving magazine 20 counterclockwise from the supply magazine 16 (Fig. 1). Thus, insulators which have an average thickness of .019" will be directed into the second magazine 20 counter-clockwise from the supply magazine 16, et cetera. Insulators which are under .013" in average thickness will be directed into the magazine 20 nine places counter-clockwise from the supply magazine 16. As the insulators are fed to the various magazines 20, in accordance with their average thickness, they will have the notches 21, as shown in Fig. 2, cut in them by the cooperating dies and the position and number of the notches will identify the particular group to which an insulator 15 belongs.

A more complete understanding of the invention may be had by reference to the following brief description thereof. A supply of insulators 15 of various thicknesses may be placed in the supply magazine 16 and the apparatus started in operation. By reference to Fig. 7, it will be seen that, in the first part of the cycle of operation, the Geneva gear 55 will index the turntable 19 and, during this indexing of the turntable, the cam 65 will retract the feeding member 123 to the position shown in Fig. 5 preparatory to feeding an insulator 15 into one of the slots 18 in the turntable 19. As soon as the turntable 19 comes to rest, the cam 65 will permit the spring 135 to rock the lever 113 and shaft 112 counter-clockwise about the axis of the shaft 112, thereby to advance an insulator 15 from the bottom of the stack in the supply magazine 16 past the soft rubber stripper 131, which will prevent more than one insulator from being fed into the slot 18. As the cam 65 feeds one insulator 15 into the slot 18 aligned with the supply magazine 16, the gaging cam ring 75 will shift all of the gaging mechanisms 74 upwardly to engage other insulators 15 which may be in the slots 18 at that time aligned with various ones of the receiving magazine 20. The gage 166, 167 and 168 and the gage reference pin 186 will thus be carried upwardly whereby the gaging pins will engage the insulators in the various slots 18 and the gage reference pins 186 will engage the undersurface of the cover plate 97. In this manner, any insulators in the slots 18 will be gaged and their associated contact making devices 144 may close circuits to their associated solenoids 208. If an insulator 15 is in alignment with a receiving magazine to which it should be directed because of its thickness, the contact making device 144 at that particular position will cause the solenoid 208 associated with it to be energized, thereby permitting the stacking rod 201 at that position to drop down and carry its associated cam roller 76 into engagement with the surface of the annular cam 72. When a stacking rod 201 drops down, it will carry the blocking portion 210 of the insulator lifting plate 209 out of alignment with the slot 18 at that position and the air blast controlling cam 37 will then become effective to blow the insulator into position above the lifting plate 209. However, those insulators which do not cause the contact making device 144 with which they are associated to close its contacts will be blocked out of the receiving magazines 20 by the portions 210 of the lifting plates 209 and, therefore, the insulators will remain in the slots 18 and will be stepped around with the turntable 19 into association with other of the receiving magazines 20 in succession until they arrive at a magazine to which they should be transferred, the cam 72 moving the gage pins to position beneath the turntable 19 after each gaging operation.

In the first cycle of the operation of the apparatus, those insulators 15 which have been transferred into position on the insulator lifting plates 209 will be moved upwardly past the catches 222, 223 and 226 associated with the lifting plates 209 on which insulators are at this time positioned. In moving to position where they will be held by the catches 222, 223 and 226, the insulators will have notches cut in them through the cooperating action of the punch 232 and die 234 at their respective stations.

What is claimed is:

1. In a sorting apparatus, a supply magazine for holding a plurality of articles to be sorted in accordance with a dimension thereof, a plurality of receiving magazines for receiving sorted articles, a turntable for receiving articles from the supply magazine and carrying them to positions adjacent the receiving magazines, gaging means adjacent each receiving magazine for gaging articles on the turntable, means controlled by the gaging means for blowing the articles from the turntable to the receiving magazines, and means at the receiving magazines for marking the articles therein, said last mentioned means comprising a portion of a receiving magazine contoured complementally with respect to another portion of the receiving magazine to mark the articles.

2. In a sorting apparatus, a supply magazine for holding a plurality of articles to be sorted, a plurality of receiving magazines for receiving sorted articles having a bottom plate, a turntable for receiving articles from the supply magazine and carrying them to positions adjacent the receiving magazines, gaging means adjacent each receiving magazine for gaging articles on the turntable, means controlled by the gaging means for blowing the articles from the turntable to the receiving magazines, means at the receiving magazines for supporting the articles in spaced relation to the bottom plate of the magazine, means for reciprocating the bottom plate of the magazine, and means on the bottom plate cooperating with a portion of a magazine for marking the articles.

3. In a sorting apparatus, a hollow spindle, a turntable rotatable about said spindle, means cooperating with said turntable to form article holding compartments, passageways in said last mentioned means in communication with said spindle, means for directing air under pressure through the spindle and passageways tending to eject articles from said compartments, means normally positioned to hold articles in said compartments, solenoid operated levers for holding said holding means in blocking position with respect to the articles, and solenoids selectively operable to actuate the solenoid-operated levers and release the holding means.

4. In a sorting apparatus, a hollow spindle, a turntable rotatable about said spindle, means cooperating with said turntable to form article holding compartments, article gaging means for measuring articles while in said compartments, passageways in said last mentioned means in communication with said spindle, means for directing air under pressure through the spindle and passageways tending to eject articles from said compartments, blocking means for normally holding the articles in said compartments, a trip lever normally supporting the last-mentioned means in position to block the articles, and a solenoid operable under control of the article gaging means at each compartment for actuating said trip lever to release the blocking means for holding the articles in the compartments and to permit them to be blown from the compartments.

5. In a sorting apparatus, a rotary article carrying means, a supply magazine for holding a supply of articles, means for transferring articles from said magazine to the article carrying means, a plurality of article receiving magazines positioned around said rotary carrying means, gaging means operable by articles of predetermined dimensions, means operable under control of said gaging means for transferring articles to selected ones of said receiving magazines to sort the articles, and means at each magazine for notching the articles with identifying notches corresponding to the receiving magazine, said last-mentioned means comprising cooperating marking elements mounted on a magazine and on a part of the transferring means.

6. In a sorting apparatus, a plurality of gaging devices for gaging the thickness of articles, means for carrying articles to the gaging devices, means controlled by the gaging devices for selectively blocking movement of the articles, means movable with the blocking means for receiving articles, and means at the receiving means operable in cooperation with the means movable with the blocking means to notch the articles with identifying notches.

7. In an article sorting apparatus, a plurality of gages for determining the average thickness of articles comprising a reference surface, means for positively engaging said reference surface, a plurality of pins movable with the means for engaging the reference surface to engage the article being gaged, said pins being resiliently mounted with respect to means engaging the reference surfaces, means operable upon a predetermined amount of relative movement between the gaging pins and the reference surface, a control circuit for controlling movement of the articles, and means controlled by said last mentioned means for operating the control circuit.

8. In an article sorting apparatus, a receiving magazine, a reciprocable plate movable to move an article into said magazine, means in said magazine for supporting articles in spaced relation to the bottom thereof, die means supported on and movable with said plate, and die means fixed in said magazine to cooperate with the first-mentioned die means to mark an article during its movement into said magazine.

EINER W. LARSEN.